(12) United States Patent
Kojo

(10) Patent No.: US 11,099,845 B2
(45) Date of Patent: Aug. 24, 2021

(54) IMAGE EDIT APPARATUS FOR CREATING SYNTHESIZED IMAGES, AND IMAGE EDIT METHOD AND RECORDING MEDIUM

(71) Applicant: CASIO COMPUTER CO., LTD., Tokyo (JP)

(72) Inventor: Takashi Kojo, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/352,747

(22) Filed: Mar. 13, 2019

(65) Prior Publication Data

US 2019/0294437 A1   Sep. 26, 2019

(30) Foreign Application Priority Data

Mar. 22, 2018 (JP) .............................. JP2018-054869

(51) Int. Cl.
*G06F 9/30* (2018.01)
*H04N 5/232* (2006.01)
*G06T 5/50* (2006.01)
*G06T 11/60* (2006.01)

(52) U.S. Cl.
CPC .............. *G06F 9/3004* (2013.01); *G06T 5/50* (2013.01); *G06T 11/60* (2013.01); *H04N 5/23229* (2013.01)

(58) Field of Classification Search
CPC ......... G06F 9/3004; G06T 11/60; G06T 5/50; H04N 5/23229
See application file for complete search history.

(56) References Cited

U.S. PATENT DOCUMENTS

| 8,737,807 | B2 | 5/2014 | Toida et al. | |
| 9,083,982 | B2 | 7/2015 | Kitamura | |
| 9,214,189 | B2 | 12/2015 | Endo | |
| 2010/0124941 | A1* | 5/2010 | Cho ................. | H04M 1/72544 455/556.1 |
| 2011/0241991 | A1* | 10/2011 | Ogura ................. | H04N 5/2254 345/158 |
| 2014/0118341 | A1* | 5/2014 | Shimizu ................ | G06T 3/4038 345/419 |
| 2015/0139495 | A1* | 5/2015 | Sohn ...................... | G06T 7/215 382/103 |

(Continued)

FOREIGN PATENT DOCUMENTS

| JP | H10290450 A | 10/1998 |
| JP | 2010028641 A | 2/2010 |

(Continued)

*Primary Examiner* — Terrell M Robinson
(74) *Attorney, Agent, or Firm* — Holtz, Holtz & Volek PC

(57) ABSTRACT

An image edit apparatus designates not only moving objects based on sequential images at the time intervals initially designated by the user, but also moving object, which was shot at shorter time intervals than the initially designated time intervals and corresponds to a freely selected position designated by the user on the locus (trajectory) of the moving objects as analysis targets of the moving objects. Thus, from the continuously shot sequential images/moving image acquired by shooting a moving object, the user designates an image at a freely selected part which is not a part of the regular time intervals, and can utilize the image for analyzing the moving object.

11 Claims, 6 Drawing Sheets

(56) References Cited

U.S. PATENT DOCUMENTS

| | | | |
|---|---|---|---|
| 2016/0028948 A1* | 1/2016 | Omori | H04N 5/23229 348/239 |
| 2016/0048973 A1* | 2/2016 | Takenaka | G06K 9/6202 382/199 |
| 2016/0086342 A1* | 3/2016 | Yamaji | G06T 7/246 382/103 |
| 2016/0328827 A1* | 11/2016 | Ilic | H04N 5/2624 |
| 2017/0096106 A1* | 4/2017 | Higuchi | B60R 1/00 |
| 2017/0163903 A1* | 6/2017 | Wang | H04N 5/23222 |
| 2017/0193309 A1* | 7/2017 | Kanda | G06T 7/20 |
| 2017/0220230 A1* | 8/2017 | Price | G06F 3/04845 |
| 2017/0280026 A1* | 9/2017 | Uejima | G06T 7/277 |
| 2018/0255232 A1* | 9/2018 | Takahashi | G06T 11/60 |
| 2019/0278467 A1* | 9/2019 | Kim | G07C 5/0816 |

FOREIGN PATENT DOCUMENTS

| | | | |
|---|---|---|---|
| JP | 2010198559 A | 9/2010 | |
| JP | 2012151817 A | 8/2012 | |
| JP | 5821625 B2 | 11/2015 | |

\* cited by examiner

IMAGE EDIT APPARATUS FOR CREATING SYNTHESIZED IMAGES, AND IMAGE EDIT METHOD AND RECORDING MEDIUM

CROSS-REFERENCE TO RELATED APPLICATION

This application is based upon and claims the benefit of priority from prior Japanese Patent Application No. 2018-054869, filed Mar. 22, 2018, the entire contents of which are incorporated herein by reference.

BACKGROUND OF THE INVENTION

1. Field of the Invention

The technical field relates to an image edit apparatus, an image edit method, and a recording medium, for use in editing sequential images which are shot at high speed.

2. Description of the Related Art

In a conventional image edit apparatus, for example, as discloses in Japanese Patent No. 5821625, the locus of a moving object (object) is graphically presented for learning, from sequential images which are continuously shot by a camera.

In the above-described image edit apparatus, for example, by utilizing images of a thrown-up object, which are included in sequential images shot at regular time intervals of, e.g. 0.1 second, an equation of motion corresponding to the locus of the movement of the object is created and graphically presented (learning of physics), or a parabola of the locus of the movement of the object is analyzed as a quadratic curve and graphically presented (learning of mathematics).

In the conventional image edit apparatus, by utilizing the sequential images captured by shooting the moving object at regular time intervals, the locus of the movement of the object is graphically presented. However, it is not possible to utilize sequential images which are not shot at regular time intervals, but are shot, for example, at regular distance intervals of the moving object, which are freely selected and designated by a user.

Specifically, in the conventional image edit apparatus, it is difficult for the user to designate and utilize sequential images of a part which the user considers necessary for analyzing the movement of the object, from among the sequential images which are shot in various situations of the movement of the object, for example, sequential images which are shot when the distance of movement per a fixed time of the moving object differs greatly, or sequential images which are shot when the moving object moves in a special manner at irregular time intervals.

BRIEF SUMMARY OF THE INVENTION

According to one embodiment, there is provided an image edit apparatus, including a processor and a storage storing instructions that, when executed by the processor, control the processor to: select a plurality of second images from among a plurality of first images obtained by shooting a moving object at first time intervals, the plurality of second images corresponding to second time intervals which are designated and are longer than the first time intervals; generate a synthesis image by synthesizing the selected second images, and display the synthesis image on a display, the synthesis image including therein a plurality of objects corresponding to the selected second images; determine whether one or more positions designated within the synthesis image on the display are corresponding positions to one or more second objects among the included objects within the synthesis image; in response to determining that the one or more positions designated within the synthesis image on the display are the corresponding positions to the one or more second objects among the included objects within the synthesis image, record the one or more positions of the one or more second objects within the synthesis image, the one or more positions being recorded as coordinates within a coordinate system set to the synthesis image; obtain at least one regression formula within the coordinate system, based on the recorded one or more positions of the one or more second objects within the synthesis image; and update the synthesis image by adding thereto at least one graph image expressing the obtained at least one regression formula, and display the updated synthesis image on the display.

According to another embodiment, there is provided a method executed by an image edit apparatus, the image edit apparatus including: a processor; and a storage storing instructions executed by the processor, wherein the method comprising: acquiring a plurality of first images obtained by shooting a moving object at time intervals; outputting a first synthesis image of a plurality of second images included in the acquired first images; and outputting, when a position, which is designated by a user operation and is other than the second images included in the first synthesis image, agrees with a position of the object included in any one of the first images, a second synthesis image in which the any one of the first images is further synthesized on the first synthesis image.

According to another embodiment, there is provided a non-transitory recording medium having a program recorded thereon that is executable to control a processor of an image edit apparatus, which includes a processor and a storage storing instructions executed by the processor, to: acquire a plurality of first images obtained by shooting a moving object at time intervals; select a plurality of second images from among the acquired first images; generate a first synthesis image by synthesizing the selected second images, and display the first synthesis image on a display; determine whether a position within the first synthesis image, which corresponds to a position of the object included in any one of the first images, has been designated on the display; and generate, when it is determined that the position within the first synthesis image, which corresponds to the position of the object included in the any one of the first images, has been designated on the display, a second synthesis image by further synthesizing the any one of the first images on the first synthesis image, and display the second synthesis image on the display.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

The components in the drawings are not necessarily to scale relative to each other.

DETAILED DESCRIPTION OF THE PREFERRED EMBODIMENTS

Embodiments of the present invention will now be described with reference to the accompanying drawing.

Figure 1:
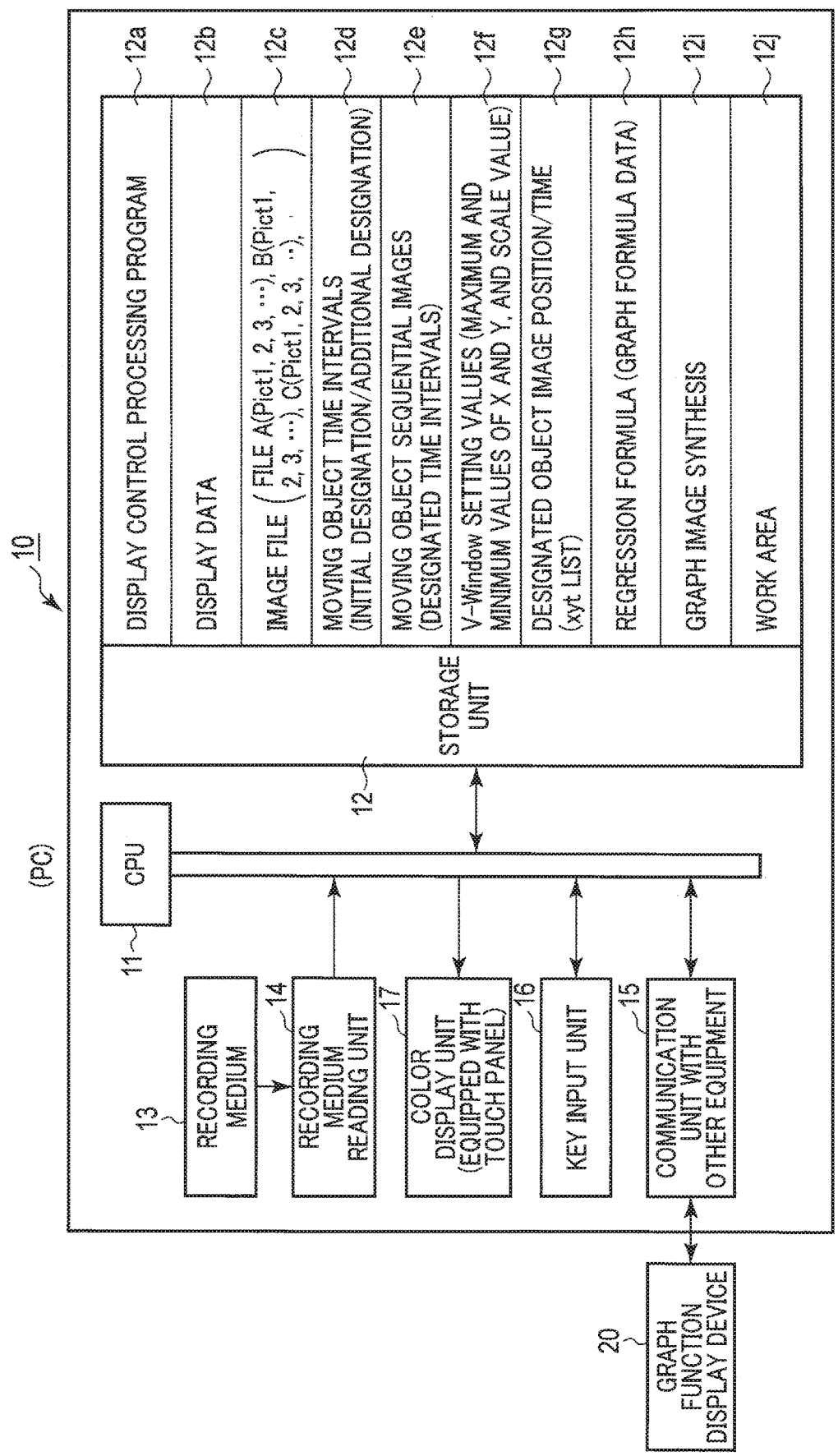
FIG. 1 is a block diagram showing a configuration of the electronic circuit of a PC (Personal Computer) 10 having an image edit/display control function according to an embodiment of an image edit apparatus in the present invention.

FIG. 1 is a block diagram showing a configuration of the electronic circuit of a PC (Personal Computer) 10 having an image edit/display control function according to an embodiment of an image edit apparatus in the present invention.

The PC 10 includes a processor (CPU) 11 serving as a computer.

The processor (CPU) 11 controls the operations of respective circuit units according to a PC control program stored in advance in a storage unit (flash ROM) 12, a PC control program loaded from an external recording medium 13 such as a CD-ROM into the storage unit 12 via a recording medium reading unit 14, or a PC control program which is downloaded by an external equipment communication unit 15 from a Web server (program server) on a communication network such as the Internet and is loaded into the storage unit 12. The processor (CPU) 11 activates the PC control program stored in the storage unit 12 in accordance with a key input signal from a key input unit 16, or a touch input signal from a touch panel-equipped color display unit 17.

The storage unit 12, the recording medium reading unit 14, the external equipment communication unit 15, the key input unit 16, and the touch panel-equipped color display unit (LCD) 17 are connected to the processor (CPU) 11.

The PC control programs stored in the storage unit (flash ROM) 12 include various application programs such as a Web browser program and image processing program. In addition, the PC control programs include a display control processing program 12a for analyzing the movement of moving objects KTn included in continuously shot images (Pict1, 2, 3, ... ), based on a great amount of image data continuously shot at intervals of, e.g. 1/100 (0.01) second.

The storage unit 12 includes a display data storage unit 12b, an image file storage unit 12c, a moving object time interval storage unit 12d, a moving object sequential image storage unit 12e, a V-Window setting value storage unit 12f, a designated object image position & time (xyt list) storage unit 12g, a regression formula storage unit 12h, a graph image synthesis storage unit 12i, and a work area 12j.

The display data storage unit 12b stores, as data of the bitmap format, display data to be displayed on the color display unit 17.

The image file storage unit 12c stores, in association with file names A, B, ... , a plurality of sets of image data (a plurality of first images) obtained by high-speed continuous shooting (or moving image shooting) of, for example, a moving object (an object which moves) by a digital camera (not shown). Each of image files A, B, ... , is associated with the time interval T of high-speed continuous shooting (or one frame of moving image shooting) which has been received from the digital camera together with the image file.

The moving object time interval storage unit 12d stores shooting time intervals of a moving object, which are initially designated by the user, and shooting time intervals of a moving object, which are additionally designated later, with respect to an image file freely designated by the user, among a plurality of sets of image files A, B, ... , which were acquired by high-speed continuous shooting of the moving object and are stored in the image file storage unit 12c.

The moving object sequential image storage unit 12e stores, in accordance with the user-designated shooting time intervals of the moving object stored in the moving object time interval storage unit 12d, sequential images (a plurality of second images) at the shooting time intervals, the sequential images being read out from the designated image file.

The V-Window setting value storage unit 12f stores a coordinate range (Xmin~Xmax, Ymin~Ymax) and the scale value of the coordinate range at a time of displaying a graph on the touch panel-equipped color display unit 17.

The designated object image position & time (xyt list) storage unit 12g stores, based on a synthesis image (first synthesis image) of sequential images corresponding to the user-designated shooting time intervals of the moving object, coordinate positions x and y of the moving objects included in the synthesis image and times t from the shooting start of the moving objects, the times t being obtained based on the shooting time intervals.

The regression formula storage unit 12h stores, based on the coordinate positions x and y of the moving objects included in the sequential images corresponding to the user-designated shooting time intervals of the moving object, a regression formula (graph formula) corresponding to the locus (trajectory) of the moving object calculated by a method of least-squares by the CPU 11.

The graph image synthesis storage unit 12i stores a synthesis image in which an image of a graph Y, which corresponds to the regression formula (graph formula) stored in the regression formula storage unit 12h, is further synthesized on the synthesis image of the sequential images corresponding to the user-designated shooting time intervals of the moving object.

In the PC 10 having the above configuration, the processor (CPU) 11 controls the operations of respective circuit units according to instructions described in the display control processing program 12a. Software and hardware operate in cooperation with each other, thereby implementing the image edit/display control function to be described in the following description of the operation.

In the present embodiment, a description is given of an example in which a great amount of image data captured by high-speed continuous shooting by a digital camera (not shown) is loaded in the PC 10 and is edited and analyzed.

Alternatively, such a configuration is possible that the image data is loaded in a graph function display device (graphing scientific calculator) 20 having an image edit/display control function similar to the image edit/display control function of the PC 10.

Next, the operation of the PC 10 with the above-described configuration will be described.

First Embodiment

Figure 2:
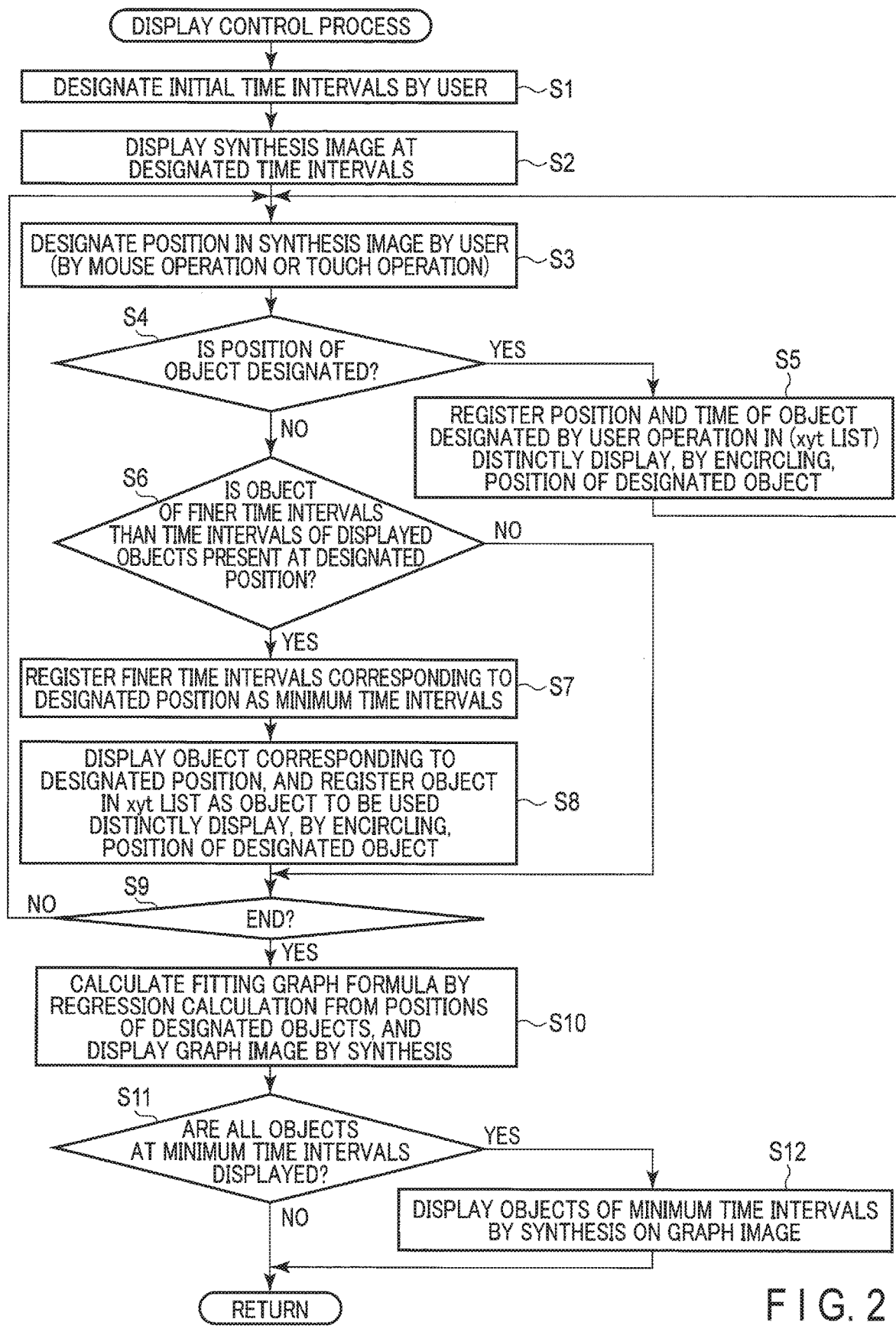
FIG. 2 is a flowchart showing a display control process by the PC 10.

FIG. 2 is a flowchart showing a display control process by the PC 10.

Figure 3:
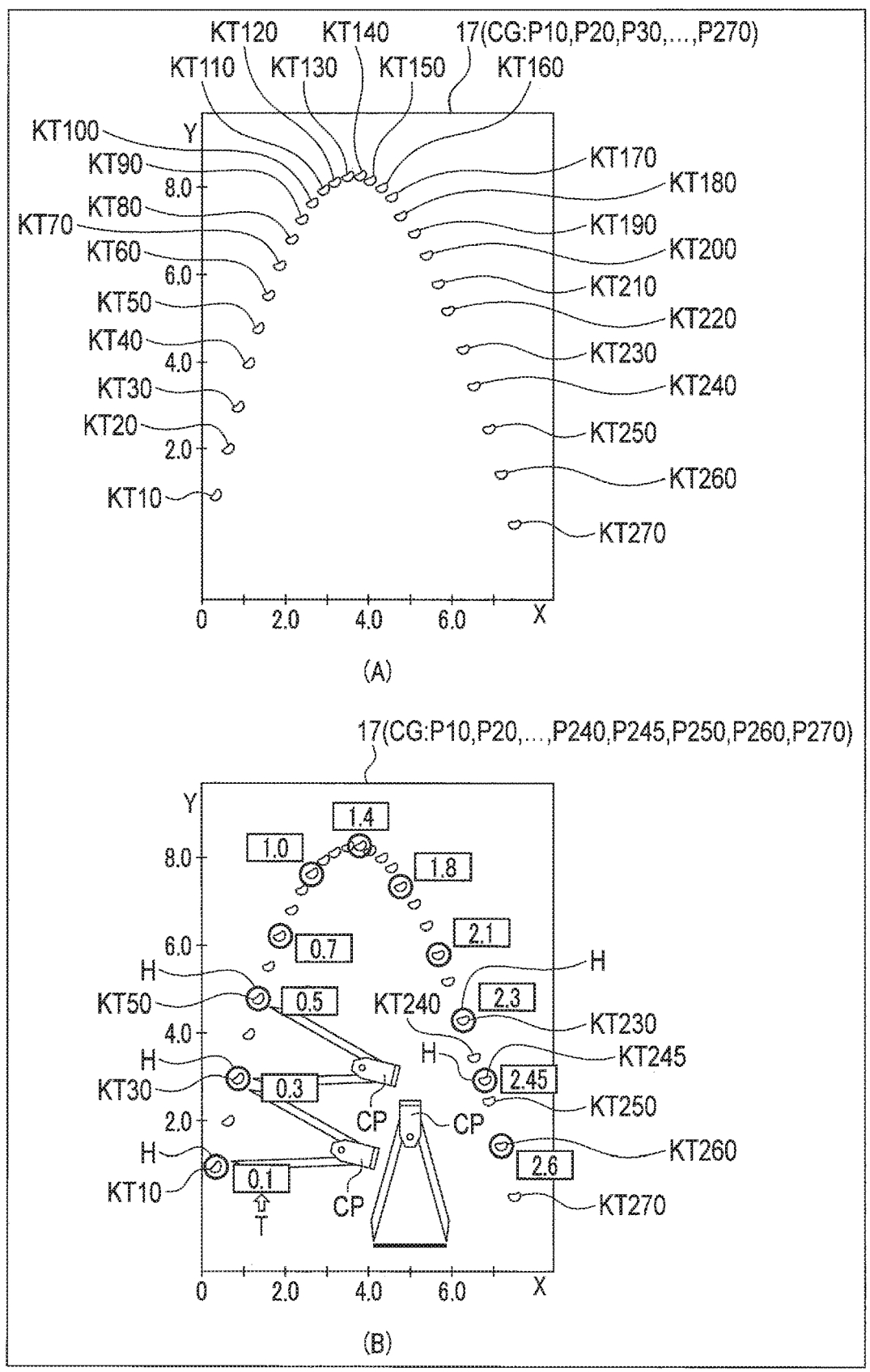
FIG. 3 shows a synthesis image CG (part 1 of a first embodiment) of object images continuously shot as a target of the display control processing of the PC 10.

FIG. 3 shows a synthesis image CG (part 1 of a first embodiment) of semispherical body images continuously shot as targets of the display control processing of the PC 10.

Figure 4:
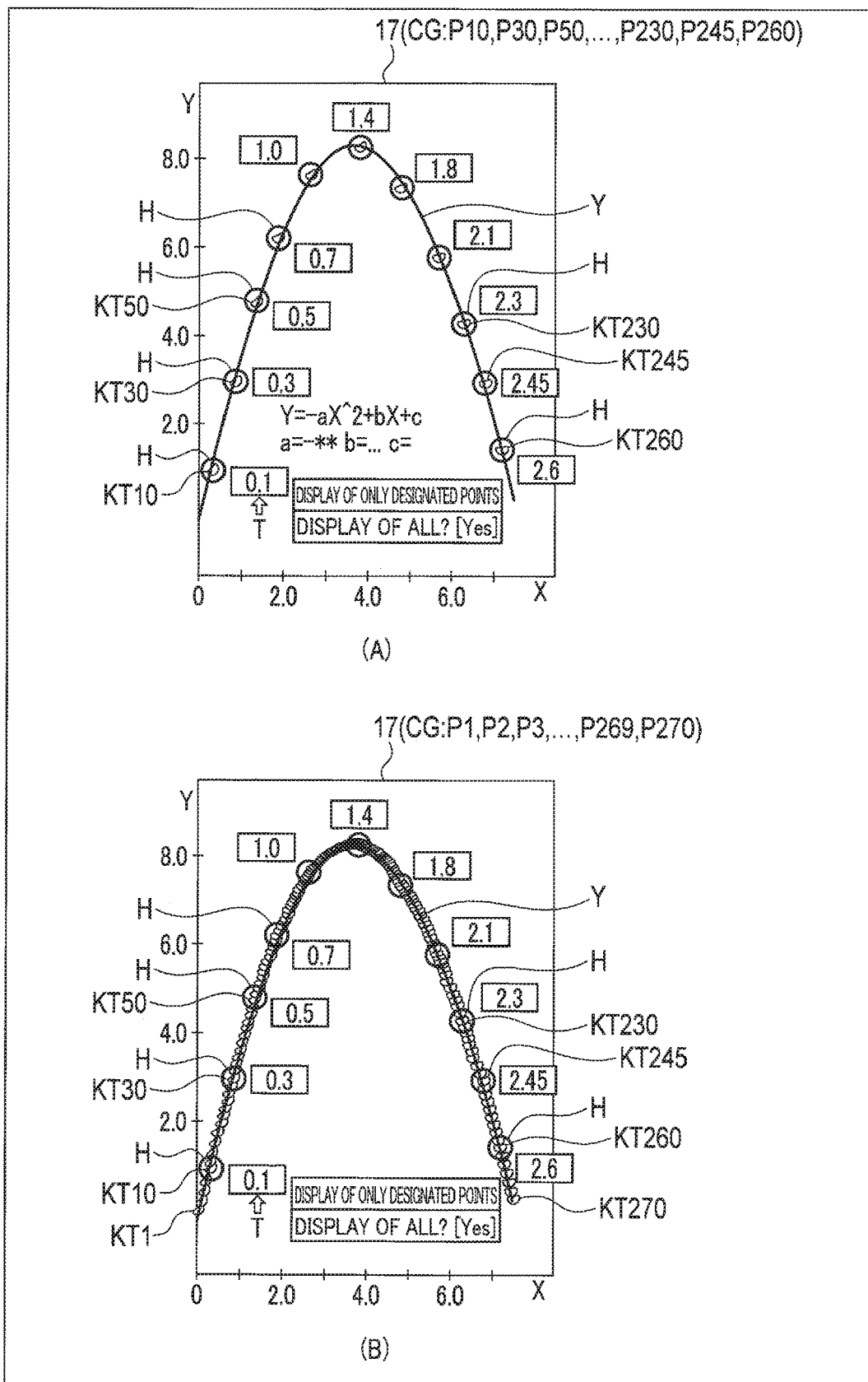
FIG. 4 shows a synthesis image CG (part 2 of the first embodiment) of object images continuously shot as a target of the display control processing of the PC 10.

FIG. 4 shows a synthesis image CG (part 2 of the first embodiment) of semispherical body images continuously shot as targets of the display control processing of the PC 10.

The image file storage unit 12c of the PC 10 stores a plurality of sets of image files A, B, . . . , obtained by high-speed continuous shooting (or moving image shooting) of a moving object as an object by a digital camera (not shown). Each of the image files A, B, . . . , is associated with the time intervals T of high-speed continuous shooting (or one frame of moving image shooting), which are received from the digital camera together with the image file.

To start with, if the display control processing program 12a is activated by the CPU 11 in response to a user operation, the CPU 11 causes the display unit 17 to display a file select screen displaying a list of file names of the image files stored in the image file storage unit 12c.

On the file select screen, if an image file A that is freely selected by the user (here, an image file obtained by high-speed continuous shooting of a thrown-up semispherical body at intervals of 1/100 (0.01) second) is designated, the CPU 11 causes the display unit 17 to display a time interval designation screen (not shown) for prompting the user to designate time intervals of sequential images necessary for analyzing the movement of the semispherical body (object), among 270 sequential images P1, P2, . . . , P270 which were continuously shot at intervals of 0.01 second and are recorded in the present image file.

On the time interval designation screen, if time intervals that are freely selected by the user (here, time intervals of 0.1 second) are designated, the CPU 11 causes the moving object time interval storage unit 12d to store the data of the designated time intervals (intervals of 0.1 second) as the initially designated time intervals (step S1).

The CPU 11 reads out 27 sequential images P10, P20, . . . , P270 at the initially designated time intervals (intervals of 0.1 second) from the designated image file, causes the moving object sequential image storage unit 12e to store the 27 sequential images P10, P20, . . . , P270, and causes the display unit 17 to display a synthesis image CG of the sequential images P10, P20, . . . , P270, as shown in part (A) of FIG. 3 (step S2).

At this time, the CPU 11 detects the range of movement of the moving objects (semispherical bodies) KT10, KT20, . . . , KT270 in the synthesis image CG, sets and displays the scale of XY coordinates, and causes the V-Window setting value storage unit 12f to store the coordinate range (Xmin~Xmax, Ymin~Ymax) and scale value corresponding to the synthesis image CG.

Thereby, the user can confirm the locus (trajectory) of movement of the moving objects KT10, KT20, . . . , KT270 at intervals of 0.1 second, among the moving objects KT1, KT2, KT3, . . . , KT270 continuously shot at intervals of 0.01 second.

Note that when the moving object (semispherical body) KT is thrown up, the speed of movement of the moving object KT sharply decreases near the apex of the trajectory that is a parabola. Then, when the moving object KT begins to fall, the speed of movement of the moving object KT sharply increases. Thus, the distance intervals of the moving objects KT10, KT20, KT30, . . . , KT270 shot at regular time intervals are narrow near the apex and become wider downward.

Here, when the user wishes to analyze the movement of, for example, moving objects as targets which are easy to view at freely selected regular distance intervals (equal intervals) among the moving objects KT10, KT20, KT30, . . . , KT270 shot at regular time intervals (intervals of 0.1 second) displayed as shown in part (A) of FIG. 3, the user performs designation, by a mouse operation or a touch operation, on the trajectory of the displayed moving objects KT10, KT20, KT30, . . . , KT270 at substantially equal intervals, as illustrated in part (B) of FIG. 3.

Note that the operation by the user to designate the equal intervals on the display unit (equipped with the touch panel) 17 can also be executed by displaying a compass image CP that is a tool for designating equal intervals in accordance with the user operation.

If the CPU 11 accepts the designation of equal intervals on the trajectory of the moving objects KT10, KT20, KT30, . . . , KT270 displayed on the display unit (equipped with the touch panel) 17 (step S3), the CPU 11 determines whether a position which is not the image of the moving object KTn was designated or not (step S4).

If the CPU 11 determines that the position of the image of the moving object KTn was designated in accordance with the user operation (step S4 (Yes)), the CPU 11 registers, in the designated object image position & time (xyt list) storage unit 12g, the data of the coordinate position (x, y) of the image of the designated moving object KTn and the data of the time t (=continuous shooting time interval T×n) from the shooting start of the sequential images Pn including the image of the moving object KTn (step S5).

In the embodiment shown in part (B) of FIG. 3, coordinate positions (x, y) and times t [0.1], [0.3], [0.5], [0.7], [1.0], [1.4], [1.8], [2.1], [2.3] and [2.6] of the moving objects KT10, KT30, KT50, KT70, KT100, KT140, KT180, KT210, KT230 and KT260, which are positioned at the user-designated equal intervals, are registered.

In addition, by the acceptance of the designation of equal intervals on the trajectory of the moving objects KT10, KT20, . . . , KT270 according to the user operation (step S3), if the CPU 11 determines that a position which is between the moving objects KT240 and KT250 and is not the image of the moving object (see parts (A) and (B) of FIG. 3) (step S4 (No)), the CPU 11 determines whether a sequential image Pn, which corresponds to the designated position and in which the moving object KTn is shot, is included as a sequential image Pn which was shot at finer (shorter) time intervals than the currently displayed sequential images P10, P20, . . . , P270 at the initially designated time intervals (intervals of 0.1 second) (step S6).

Here, the designated image file is the image file of sequential images P1, P2, P3, . . . , P270 continuously shot at time intervals of 1/100 (0.01) second, and the CPU 11 determines that a sequential image P245, which is obtained by shooting a moving object KT245 corresponding to the designated position between the moving objects KT240 and KT250, is included in the designated image file (step S6 (Yes)).

Then, the CPU 11 additionally registers, in the moving object time interval storage unit 12d, the (shooting) time intervals (0.01 second) of the sequential image P245, which includes the moving object KT245 corresponding to the designated position between the moving objects KT240 and KT250, as additionally designated minimum time intervals (step S7).

Further, the CPU 11 causes the moving object sequential image storage unit 12e to additionally store the sequential image P245 corresponding to the designated position at the equal intervals. The CPU 11 additionally synthesizes the sequential image P245 corresponding to the designated position on the synthesis image CG of the sequential images P10, P20, P30, . . . , P270 at intervals of 0.1 second, which are currently displayed on the display unit 17, and displays the synthesized image. Further, the CPU 11 additionally registers, in the designated object image position & time (xyt list) storage unit 12g, the data of the coordinate position (x, y) of the moving object KT245 included in the additionally synthesized sequential image P245, and the data of the time t [2.45] from the shooting start (step S8).

As shown in part (B) of FIG. 3, based on the data registered in the designated object image position & time (xyt list) storage unit 12g, the CPU 11 distinctly displays (H), by encircling, the images of the moving objects KT10, KT30, KT50, . . . , KT230, KT245 and KT260 designated at the equal intervals, and additionally displays the times t [0.1], [0.3], [0.5], . . . , [2.3], [2.45] and [2.6] from the shooting start time with respect to the images of the moving objects KT10, KT30, KT50, . . . , KT230, K245 and KT260 designated at the equal intervals.

Thereby, based on the positions of the moving objects KT10, KT30, KT50, . . . , KT230, KT245 and KT260 designated at the equal intervals and distinctly displayed (H), and based on the times t [0.1], [0.3], [0.5], . . . , [2.3], [2.45] and [2.6] from the shooting start time, which are displayed by being added to the moving objects KT10, KT30, KT50, . . . , KT230, K245 and KT260, the user can easily recognize that the moving objects KT10, KT30, KT50, . . . , KT230, K245 and KT260 are not the images shot at regular time intervals.

Thereafter, when the CPU 11 determines that a moving object KTn exists at a designated position at equal intervals on the trajectory of the currently displayed moving objects KT10, KT20, KT30, . . . , KT270, the CPU 11 repeatedly executes the process of steps S3 to S5. On the other hand, when the CPU 11 determines that a moving object KTn does not exist at a designated position at the equal intervals and the designated image file includes a sequential image Pn which was shot at finer (shorter) time intervals than the initially designated time intervals and in which the moving object KTn at the designated position is captured, the CPU 11 repeatedly executes the process of steps S3, S4, and S6 to S9.

When the CPU 11 determines that the operation of the designation at the equal intervals is finished in accordance with the user operation (step S9 (Yes)), the CPU 11 causes the display unit 17 to display a synthesis image CG in which the sequential images P10, P30, P50, . . . , P230, P245 and P260 of the moving objects KT10, KT30, KT50, . . . , KT230, KT245 and KT260, which are designated at the equal intervals and distinctly displayed (H), are synthesized, as shown in part (A) of FIG. 4. In addition, based on the coordinate positions of the moving objects KT10, KT30, KT50, . . . , KT230, KT245 and KT260 designated at the equal intervals, which are registered in the designated object image position & time (xyt list) storage unit 12g, the CPU 11 automatically generates, by performing regression calculation by a method of least-squares, a graph formula [Y=−ax2+bx+c] corresponding to the locus (trajectory) of the moving objects KT10, KT30, KT50, . . . , KT230, KT245 and KT260, and causes the regression formula storage unit 12h to store the graph formula. Then, an image of a graph Y corresponding to the generated graph formula is further synthesized on the synthesis image CG (P10, P30, P50, . . . , P230, P245 and P260) in the graph image synthesis storage unit 12i, and is displayed (step S10).

The CPU 11 displays, in a superimposed manner on the display screen of the synthesis image CG on which the image of the graph Y is synthesized, the graph formula [Y=−ax2+bx+c] automatically generated by the regression calculation, and a display mode message [display of only designated points/display of all?] which prompts the user to choose the display of only the moving objects KT10, KT30, KT50, . . . , KT230, KT245 and KT260 designated at the equal intervals, or the display of the moving objects KT1 to KT270 of all sequential images P1 to P270 in the designated image file.

The CPU 11 accepts the choice and designation of [display of all] of the display mode message [display of only designated points/display of all?] by the user's mouse operation or touch operation (step S11 (Yes)).

Then, the CPU 11 synthesizes all sequential images P1 to P270 and the image of the graph Y, which corresponds to the graph formula stored in the regression formula storage unit 12h, in the graph image synthesis storage unit 12i. The sequential images P1 to P270 include the images of the moving objects KT1 to KT270 continuously shot at the minimum time intervals (intervals of 0.01 second) and recorded in the designated image file, in accordance with the minimum time intervals (intervals of 0.01 second) additionally registered in the moving object time interval storage unit 12d in step S7. The CPU 11 causes the display unit 17 to display the synthesized image as a synthesis image CG as shown in part (B) of FIG. 4. In addition, based on the data registered in the designated object image position & time (xyt list) storage unit 12g, the CPU 11 distinctly displays (H), by encircling, the images of the moving objects KT10, KT30, KT50, . . . , KT230, KT245 and KT260 designated at the equal intervals, and additionally displays the times t [0.1], [0.3], [0.5], . . . , [2.3], [2.45] and [2.6] from the shooting start time with respect to the images of the moving objects KT10, KT30, KT50, . . . , KT230, K245 and KT260 designated at the equal intervals (step S12).

Thereby, the display unit 17 can display not only the synthesis image CG between the sequential images P10, P30, P50, . . . , P230, P245 and P260, in which the moving objects KT10, KT30, KT50, . . . , KT230, KT245 and KT260 designated at the regular time intervals or equal intervals (distances) according to the user operation are shot, and the graph Y corresponding to the locus of movement of these moving objects KTn, as shown in part (A) of FIG. 4. Further, the display unit 17 can also display, as shown in part (B) of FIG. 4, all sequential images P1 to P270 by synthesis, which are captured by shooting the moving objects KT1 to KT270 at finer (shorter) time intervals than the sequential images P10, P30, P50, . . . , P230, P245 and P260 and are recorded in the image file A.

Figure 5:
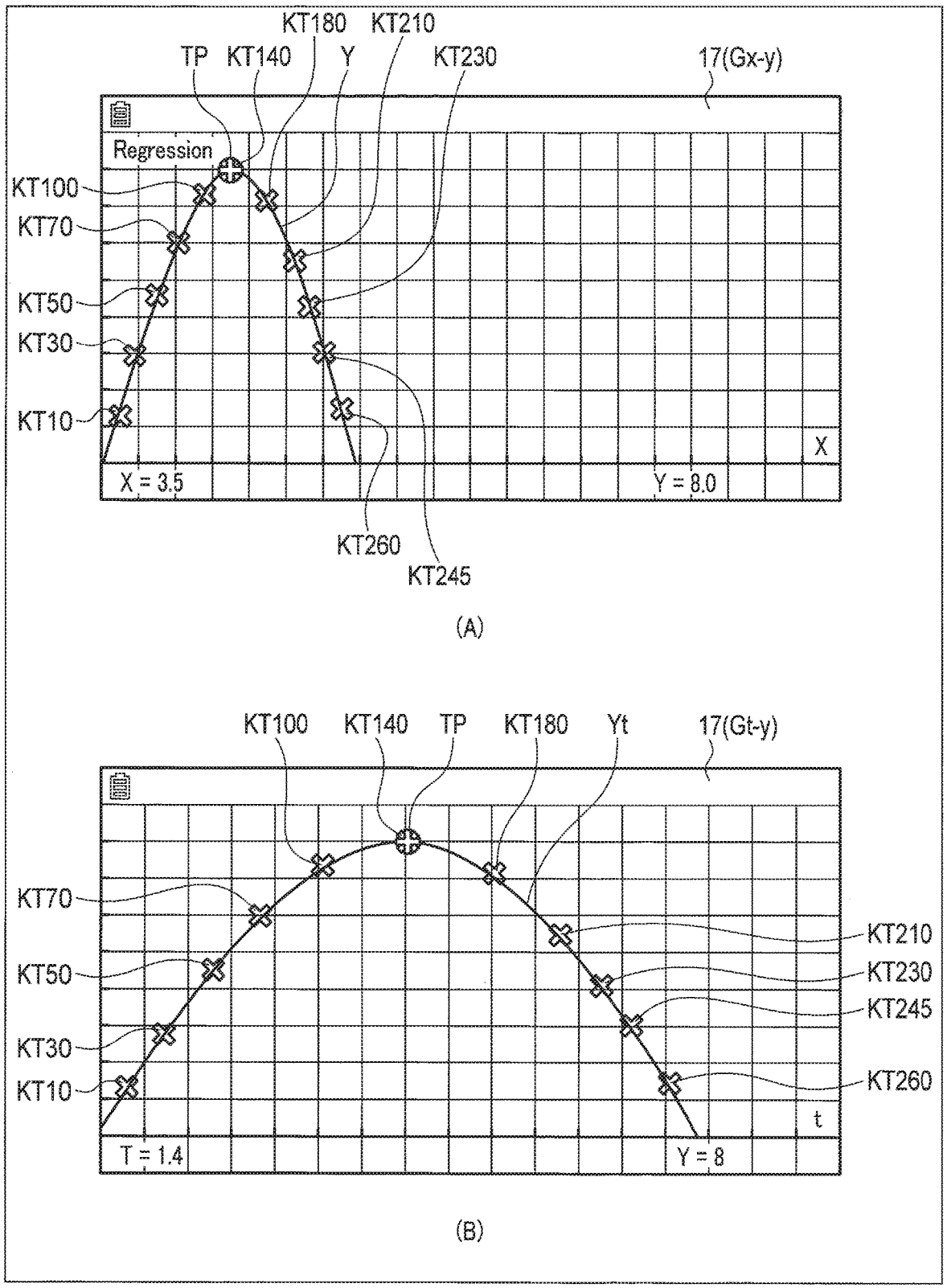
FIG. 5 shows analysis display operations of an x-y graph Y and a t-y graph Yt, whose targets are sequential images including images of moving objects KT10, KT30, KT50, ..., KT230, KT245 and KT260 designated at equal intervals according to the display control processing of the PC 10.

FIG. 5 shows analysis display operations of an x-y graph Y and a t-y graph Yt, whose targets are sequential images P10, P30, P50, . . . , P230, P245 and P260 including the images of moving objects KT10, KT30, KT50, . . . , KT230, KT245 and KT260 designated at equal intervals according to the display control processing of the PC 10.

The PC 10 described in the present embodiment is equipped with an emulator program of the graph function display device (graphing scientific calculator) 20.

The emulator program is activated by the CPU 11 in response to a user operation, and the PC 10 is set in a state of being also operable as the graph function display device 20. Thereafter, for example, an operation is accepted which designates an image file A that is stored in the image file storage unit 12c and is the target of the above-described display control processing (here, an image file obtained by high-speed continuous shooting of a thrown-up semispherical body at intervals of 1/100 (0.01) second).

Then, in accordance with the designated image file A, the CPU 11 causes the display unit 17 to display an xy graph screen Gx-y which renders the xy coordinates of respective moving objects KTn and an x-y graph Y corresponding to the locus of the moving objects KTn, as shown in part (A) of FIG. 5, based on the coordinate range (Xmin~Xmax, Ymin~Ymax) and the scale value stored in the V-Window setting value storage unit 12f, the coordinate positions (x, y) of the moving objects KT10, KT30, KT50, KT70, KT100, KT140, KT180, KT210, KT230, KT245 and KT260 located at the user-designated equal intervals, which are stored in the designated object image position & time (xyt list) storage unit 12g, and the graph formula Y corresponding to the locus (trajectory) of the moving objects KT10, KT30, KT50, . . . , KT230, KT245 and KT260, the graph formula Y being stored in the regression formula storage unit 12h.

On the xy graph screen Gx-y, the CPU 11 displays a trace pointer TP on the x-y graph Y, and moves the trace pointer TP on the x-y graph Y in accordance with the user's touch operation or mouse operation on the trace pointer TP. Then, the X coordinate and Y coordinate on the graph Y, at which the trace pointer TP is located, is displayed along the lower end in the screen Gx-y.

If an instruction is given to switch the x-y graph Y and t-y graph Yt by the user operation, the CPU 11 causes the display unit 17 to display an ty graph screen Gt-y which renders the ty coordinates of respective moving objects KTn and a t-y graph Yt corresponding to the locus of the moving objects KTn, as shown in part (B) of FIG. 5, based on the Y-directional coordinate range (Ymin~Ymax) and the scale value stored in the V-Window setting value storage unit 12f, and the Y-directional coordinate positions (y) of the moving objects KT10, KT30, KT50, KT70, KT100, KT140, KT180, KT210, KT230, KT245 and KT260 located at the user-designated equal intervals, and times t [0.1], [0.3], [0.5], [0.7], [1.0], [1.4], [1.8], [2.1], [2.3], [2.45] and [2.6] from the shooting start, which are stored in the designated object image position & time (xyt list) storage unit 12g.

On this graph screen Gt-y, the CPU 11 displays the trace pointer TP on the t-y graph Yt, and moves the trace pointer TP on the t-y graph Yt in accordance with the user's touch operation or mouse operation on the trace pointer TP. Then, the T coordinate and Y coordinate on the t-y graph Yt, at which the trace pointer TP is located, is displayed along the lower end in the screen Gt-y.

Thus, according to the image edit/display control function of the first embodiment by the PC 10 with the above-described configuration, sequential images P10, P20, P30, . . . , P270 (a plurality of second images), which are captured by shooting the moving objects KT10, KT20, KT30, . . . , KT270 at the user-designated (initially designated) time intervals (e.g. intervals of 0.1 second), are read out as analysis targets of the moving objects KTn from the image file A of sequential images P1 to P270 (a plurality of first images) captured by continuously shooting the moving object KT (object) at regular time intervals (e.g. intervals of 0.01 second). The read-out sequential images P10, P20, P30, . . . , P270 are synthesized as a synthesis image CG (first synthesis image), and the synthesis image CG is displayed on the touch panel-equipped display unit 17. If a freely selected position (a position other than the second images), where the moving object KTn is not displayed, is designated by the user operation on the locus (trajectory) of the moving objects KT10, KT20, KT30, . . . , KT270 on the displayed synthesis image CG, a sequential image Pn (any one of the first images), which was shot at finer (shorter) time intervals (0.01 second) than the designated time intervals (0.1 second) and in which the moving object KTn is shot at the designated position, is read out from the image file A, and a synthesis image (second synthesis image) obtained by additionally synthesizing the sequential image Pn on the synthesis image CG is displayed.

In addition, based on the positions (xy coordinates) on the synthesis image CG of the moving objects KT10, KT20, KT30, . . . , KTn, . . . , KT270 including the moving object KTn at the position designated on the synthesis image CG, the graph formula corresponding to the locus (trajectory) of the moving objects KT10, KT20, KT30, . . . , KTn, . . . , KT270 is obtained by regression calculation, and a grapy Y corresponding to the calculated graph formula is further synthesized on the synthesis image CG and is displayed.

Thereby, not only the moving objects KT10, KT20, KT30, . . . , P270 based on the sequential images P10, P20, P30, . . . , P270 at the time intervals initially designated by the user, but also the moving object KTn, which was shot at shorter time intervals than the initially designated time intervals and corresponds to a freely selected position designated by the user on the locus (trajectory) of the moving objects KT10, KT20, KT30, . . . , P270, can be designated as analysis targets of the moving objects KT.

Thus, from the continuously shot sequential images/moving image acquired by shooting a moving object, the user can designate an image at a freely selected part which is not a part of the regular time intervals, and can utilize the image for analyzing the moving object.

Furthermore, according to the image edit/display control function of the first embodiment by the PC 10 with the above-described configuration, the synthesis image CG (first synthesis image) of the sequential images P10, P20, P30, . . . , P250, P260, P270 (second images) corresponding to the time intervals initially designated by the user is displayed. Thereafter, a synthesis image CG (second synthesis image), in which the sequential image P245 including the moving object is added to a freely designated position on the synthesis image CG (first synthesis image), is displayed. The moving objects KT10, KT20, KT30, . . . , KT230, KT245, KT260, KT270 included in the respective sequential images and the graph Y, which analyzes the locus (trajectory) of each moving object, are displayed. From this state, in accordance with the user operation, the shooting time intervals of the sequential image P245 including the moving object at the freely designated position are set as the minimum time intervals, and all sequential images P1 to P270 (first images) of the minimum time intervals included in the image file A are synthesized. Thus, a synthesis image (third synthesis image) of the moving objects KT1 to KT270 corresponding to all sequential images P1 to P270 can be displayed.

Besides, according to the image edit/display control function of the first embodiment by the PC 10 with the above-described configuration, on the synthesis image CG (second synthesis image), each moving object KTn designated in accordance with the user operation can be distinctly displayed (H) by encircling the moving object KTn, and the time t from the shooting start can be added to the distinctly displayed (H) moving object KTn and displayed, based on the time intervals of the sequential image Pn of each moving object KTn.

Thereby, for example, when the sequential images P10, P20, P30, . . . , P230, P245, P260 and P270 including the moving objects KT10, KT20, KT30, . . . , KT230, KT245, KT260, KT270 are sequential images captured by shooting a thrown-up object KT, it is possible to easily confirm, by visual recognition, that the distances between the moving objects KT10, KT20, KT30, . . . , KT230, KT245, KT260, KT270 are not equal intervals, even if the shooting intervals of the moving objects KT10, KT20, KT30, . . . , KT230, KT245, KT260, KT270 are regular time intervals.

In the image edit/display control function of the first embodiment, the synthesis image CG of the sequential images P10, P20, P30, . . . , P270 including the moving objects KT10, KT20, KT30, . . . , KT270 at the time intervals initially designated by the user is displayed. In this state, a freely selected position, at which the moving object KTn is absent, is designated on the locus (trajectory) of the moving objects KT10, KT20, KT30, . . . , KT270. At this time, if there is a sequential image Pn, which is shot at shorter time intervals than the sequential images P10, P20, P30, . . . , P270 at the initially designated time intervals and includes the image of the moving object KTn corresponding to the designated position, such a configuration is adopted that the synthesis image CG, in which the sequential image Pn is additionally synthesized, is displayed, and the moving object KTn corresponding to the designated position is also set as the target of analysis.

On the other hand, as will be described in the next second embodiment (see FIG. 6), in the state in which the synthesis image CG of the sequential images P10, P20, P30, . . . , P220 including the moving objects KT10, KT20, KT30, . . . , KT220 at the initially designated time intervals is displayed, a freely selected range of the synthesis image CG including a part of the locus (trajectory) of the moving objects KT10, KT20, KT30, . . . , KT220 is designated and displayed in enlarged scale. At this time, if there are sequential images Pn, which are shot at shorter time intervals than the sequential images P10, P20, P30, . . . , P220 at the initially designated time intervals and include the images of the moving objects KTn corresponding to positions between mutually neighboring moving objects KT120, KT130, KT140, . . . , KT220 included in the range displayed in enlarged scale, such a configuration may be adopted that a synthesis image CG in which the sequential images Pn are additionally synthesized and the moving objects KTn corresponding to positions between the moving objects KT120, KT130, KT140, . . . , KT220 in the designated range are also set as targets of analysis.

Second Embodiment

Figure 6:
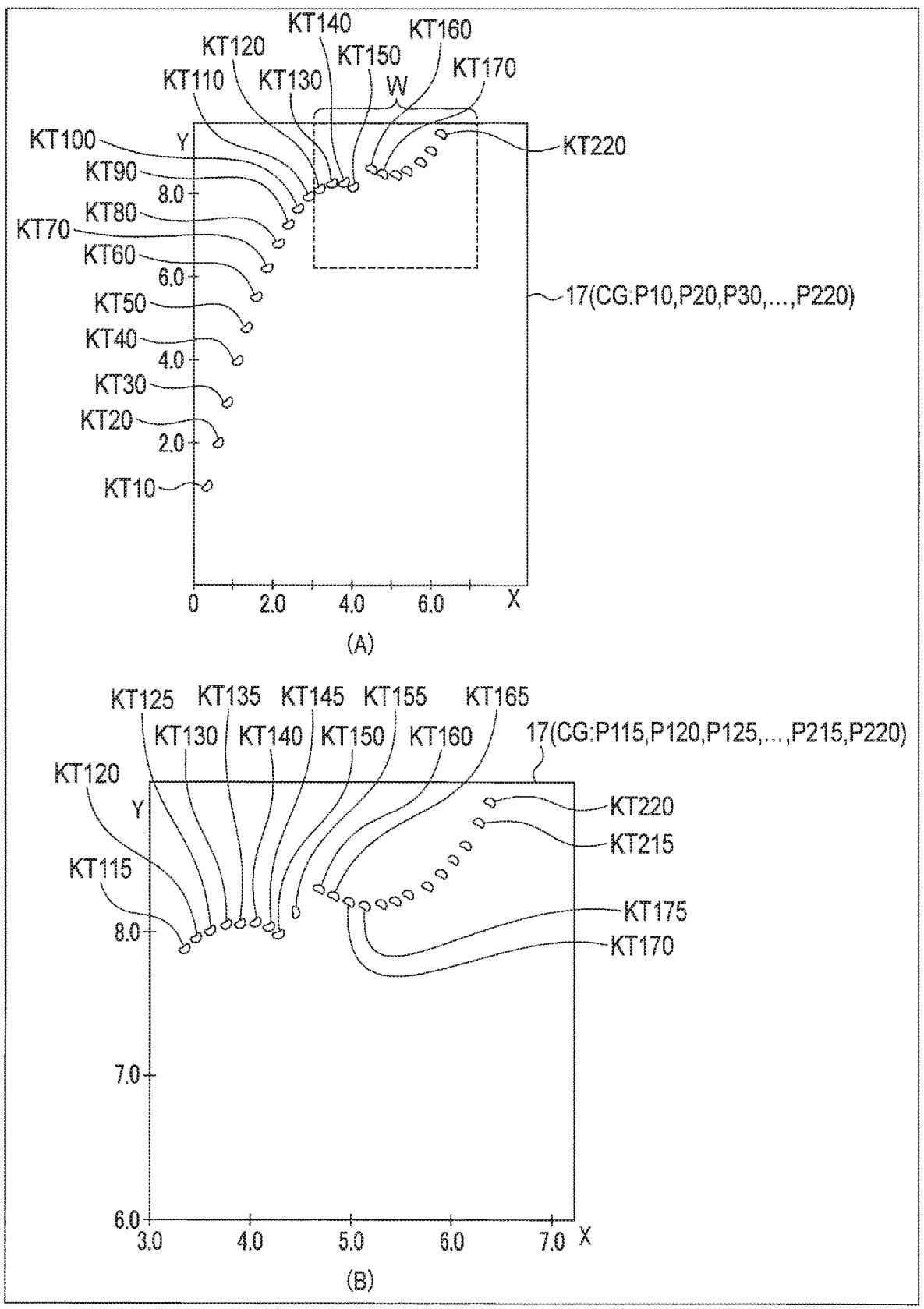
FIG. 6 shows a synthesis image CG (a second embodiment) of object images continuously shot as a target of the display control processing of the PC 10.

FIG. 6 shows a synthesis image CG (a second embodiment) of semispherical body images continuously shot as a target of the display control processing of the PC 10.

In the second embodiment, for example, an image file B is described as an object. In the image file B, for example, when an object KT, which is formed of a plastic piece or a metal, is thrown up, the state of special movement of the object KT due to the influence of a wind, a special magnetic field, etc., is continuously shot at high speed.

Like the first embodiment, it is assumed that the time intervals of continuous shooting are 1/100 second (0.01 second), and the time intervals initially designated for analysis are 0.1 second.

If the image file B is designated and the time intervals of 0.1 second of the moving objects KT that are the targets of analysis are designated in accordance with user operations, the CPU 11 reads out and synthesizes sequential images P10, P20, P30, . . . , P220 at the designated time intervals (0.1 second), as shown in part (A) of FIG. 6, from among 220 sequential images P1 to P220 recorded in the designated image file B. The CPU 11 causes the touch panel-equipped display unit 17 to display the synthesized image as a synthesis image CG.

On the locus (trajectory) of the moving objects KT10, KT20, KT30, . . . , KT220 shot at intervals of 0.1 second, which are displayed on the synthesis image CG, if a partial range W on the locus, where the object KT moves in a special manner, is designated in accordance with the user operation (mouse operation or touch operation), the CPU 11 enlarges the synthesis image CG corresponding to the designated range and causes the display unit 17 to display the enlarged synthesis image CG on the display, as shown in part (B) of FIG. 6.

The CPU 11 determines whether there are sequential images Pn which are shot at shorter time intervals than the sequential images P10, P20, P30, . . . , P220 at the initially designated time intervals (0.1 second) and include the images of the moving objects KTn corresponding to positions between the mutually neighboring moving objects KT120, KT130, KT140, . . . , KT220 included in the range displayed in enlarged scale.

Here, it is determines that there are sequential images P111-119, P121-129, P131-139, . . . , P211-219 which are shot at shorter time intervals (0.01 second) than the initially designated time intervals (0.1 second) and include the images of moving objects KT111-119, KT121-129, KT131-139, . . . , KT211-219 corresponding to positions between the mutually neighboring moving objects KT120, KT130, KT140, . . . , KT220 included in the range that is displayed in enlarged scale.

The CPU 11 causes the display unit 17 to display a synthesis image CG in which the sequential images P111-119, P121-129, P131-139, . . . , P211-219, which include the images of moving objects KT111-119, KT121-129, KT131-139, . . . , KT211-219 corresponding to positions between the mutually neighboring moving objects KT120, KT130, KT140, . . . , KT220 that are displayed in enlarged scale, are additionally synthesized.

Part (B) of FIG. 6 illustrates an example of the display of a synthesis image CG (P115, P120, P125, . . . , P215, P220) in which the sequential images P115, P125, P135, . . . , P215, which include the images of moving objects KT115, KT125, KT135, . . . , KT215 corresponding to intermediate positions (set by the user) between the mutually neighboring moving objects KT120, KT130, KT140, . . . , KT220 that are displayed in enlarged scale, are additionally synthesized.

Like the first embodiment, the positions (xy coordinates) of the moving objects KT115, KT120, KT125, KT130, KT135, . . . , KT215, KT220 in the synthesis image CG that is displayed in enlarged scale, and the times t from the shooting start corresponding to the time intervals of the sequential images P115, P120, P125, P130, P135, . . . , P215, P220 including the images of these moving objects KT115, KT120, KT125, KT130, KT135, . . . , KT215, KT220, are registered in the designated object image position & time (xyt list) storage unit 12g.

Like the first embodiment, based on the positions (xy coordinates) of the moving objects KT115, KT120, KT125, KT130, KT135, . . . , KT215, KT220, and the times t, which are registered in the designated object image position & time (xyt list) storage unit 12g, the CPU 11 can distinctly display, by encircling, the moving objects KT115, KT120, KT125, KT130, KT135, . . . , KT215, KT220, can display the moving objects KT115, KT120, KT125, KT130, KT135, . . . , KT215, KT220 by adding times t thereto, and can calculate, by regression calculation, the graph formula corresponding to the locus of the moving objects KT115, KT120, KT125, KT130, KT135, . . . , KT215, KT220 and can synthesize the graph Y corresponding to the calculated graph formula on the synthesis image CG, thus enabling the analysis.

Therefore, according to the image edit/display control function of the second embodiment by the PC 10 with the above-described configuration, sequential images P10, P20, P30, . . . , P220, which are captured by shooting the moving objects KT10, KT20, KT30, . . . , KT220 at the user-designated (initially designated) time intervals (e.g. 0.1 second), are read out as analysis targets of the moving objects KTn from the image file B of sequential images P1 to P220 captured by continuously shooting the moving object KT at regular time intervals (e.g. intervals of 0.01 second). The read-out sequential images P10, P20, P30, . . . , P220 are synthesized as a synthesis image CG, and the synthesis image CG is displayed on the touch panel-equipped display unit 17. If the freely selected range W including a part of the locus (trajectory) of the moving objects KT10, KT20, KT30, . . . , KT220 on the displayed synthesis image CG is designated by the user operation and displayed in enlarged scale, the sequential images Pn, which are shot at finer (shorter) time intervals (0.01 second) than the designated time intervals (0.1 second) and in which the moving objects KTn are shot at positions between the moving objects KT120, KT130, . . . KT 220 that are displayed in enlarged scale, are read out from the image file B, and a synthesis image obtained by additionally synthesizing the sequential images Pn on the synthesis image CG is displayed.

In addition, based on the positions (xy coordinates) on the synthesis image CG of the moving objects including the moving objects KTn added by the enlarged display, the graph formula corresponding to the locus (trajectory) of the respective moving objects is obtained by regression calculation, and the grapy Y corresponding to the calculated graph formula is further synthesized on the synthesis image CG and is displayed.

Thereby, not only the moving objects KT10, KT20, KT30, . . . , P220 based on the sequential images P10, P20, P30, . . . , P220 at the time intervals initially designated by the user, but also the moving objects KTn, which were shot at shorter time intervals than the initially designated time intervals and correspond to the user-designated range W including a freely selected part of the locus (trajectory) of the moving objects KT10, KT20, KT30, . . . , P220 can be designated as analysis targets of the moving objects KT.

Thus, from the continuously shot sequential images/moving image acquired by shooting a moving object, the user can designate an image of a freely selected part, which is not a part at regular time intervals, and can utilize the image for analyzing the moving object.

In the above-described embodiments, the configuration was described in which the display control processing is executed by using, as the target, the image file (A, B, . . . ) in which a moving object is continuously shot at high speed (shooting time interval T). The moving object can also be analyzed according to the same image edit/display control function (first embodiment/second embodiment) when the target is the image file (A, B, . . . ) acquired by moving image shooting (shooting time intervals T for one frame of the moving image).

In an alternative configuration, the image files A, B, . . . , which are stored in the image file storage unit 12c of the embodiments, may be downloaded and acquired via the communication unit 15 from a server apparatus on an external communication network.

In an alternative configuration, the image edit/display control function of the embodiments may be implemented in a server apparatus on a communication network, and the server apparatus may generate the display screens shown in FIG. 3 to FIG. 6 in accordance with an operation signal from a terminal device possessed by the user, and may output the display screens to the terminal device.

The operation methods by the PC 10 and graphing scientific calculator 20 described in the above embodiments, that is, the methods such as display control processing shown in the flowchart of FIG. 2, display control processing (first embodiment) corresponding to the display operations of FIG. 3, FIG. 4 and FIG. 5 and display control processing (second embodiment) corresponding to the display operation of FIG. 6 can be stored and distributed as computer-executable programs in the external recording medium 13 such as a memory card (for example, ROM card or RAM card), magnetic disk (for example, floppy (trademark) disk or hard disk), optical disk (for example, CD-ROM or DVD), or semiconductor memory. The computer 11 of the electronic calculator 10 (20) loads a program stored in the external recording medium 13 into the storage device 12, and controls the operation according to the loaded program. The computer 11 can therefore implement the function of analyzing a moving object from high-speed continuously shot images, which has been described in the above embodiments, and can execute the same processes according to the above-described methods.

Program data for implementing the methods can be transmitted in the form of program codes on a communication network (public line). The communication device 15 connected to the communication network can load the program data into the computer 11 of the electronic calculator 10. This can implement the above-described function of analyzing a moving object from high-speed continuously shot images of the moving object Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image edit apparatus comprising:
a processor; and
a storage storing instructions that, when executed by the processor, control the processor to:
select a plurality of second images from among a plurality of first images obtained by shooting a moving object at first time intervals, the plurality of second images corresponding to second time intervals which are designated and are longer than the first time intervals;

generate a synthesis image by synthesizing the selected second images, and display the synthesis image on a display, the synthesis image being a single image including therein a plurality of second objects, and each of the second objects being an instance of the moving object at a position at which it appears in a respective one of the selected second images;

determine whether each of one or more designated positions, which are positions designated by a user operation within the synthesis image displayed on the display, corresponds to one of the positions of the second objects included within the synthesis image;

in response to determining that each of the one or more designated positions corresponds to one of the positions of the second objects included within the synthesis image, record the one or more designated positions as coordinates within a coordinate system set to the synthesis image;

obtain at least one regression formula within the coordinate system, based on the recorded one or more designated positions;

update the synthesis image by adding thereto at least one graph image expressing the obtained at least one regression formula, and display the updated synthesis image on the display;

in response to determining that one designated position among the one or more designated positions does not correspond to any of the positions of the second objects included within the synthesis image, re-determine whether the one designated position corresponds to a position of one of first objects among a plurality of first objects included within the first images, each of the first objects being an instance of the moving object in a respective one of the first images; and in response to re-determining that the one designated position corresponds to a position of one of the first objects, record the position of the one of the first objects within the synthesis image, wherein the processor is controlled to, in the obtaining the at least one regression formula, obtain the at least one regression formula within the coordinate system, based both on the recorded one or more designated positions corresponding to the second objects and the recorded position of the one of the first objects within the synthesis image.

2. The image edit apparatus according to claim 1, wherein the processor, under control of the instructions, is further controlled to:

in response to re-determining that the one designated position corresponds to a position of one of the first objects, update the synthesis image by adding thereto all the first objects included within the first images, and display the updated synthesis image on the display.

3. The image edit apparatus according to claim 1, wherein the processor, under control of the instructions, is further controlled to:

in the displaying the synthesis image on the display, display at least one of (i) the one of the first objects and (ii) the second objects in the synthesis image distinguishably within the synthesis image.

4. The image edit apparatus according to claim 1, wherein the processor, under control of the instructions, is further controlled to:

in the recording the position of the one of the first objects and the one or more designated positions, record, by associating, the position of the one of the first objects and the one or more designated positions and times at which, among the first images, images corresponding to the one of the first objects whose position was recorded and the second objects whose designated positions were recorded were shot.

5. The image edit apparatus according to claim 4, wherein the processor, under control of the instructions, is further controlled to:

generate a graph in which values corresponding to the respective times are plotted on an abscissa axis, and values corresponding to the respective positions are plotted on an ordinate axis, and display the graph on the display.

6. The image edit apparatus according to claim 1, wherein the processor, under control of the instructions, is further controlled to:

determine whether an instruction to enlarge the synthesis image has been accepted while the synthesis image is being displayed on the display; and in response to determining that the instruction to enlarge the synthesis image has been accepted while the synthesis image is being displayed on the display, enlarge the synthesis image, update the synthesis image by adding thereto all the first objects in the first images to the enlarged synthesis image, and display the updated synthesis image on the display.

7. The image edit apparatus according to claim 1, wherein the user operation performed within the synthesis image displayed on the display is one of an operation input by an input device and a touch operation, and wherein the processor determines whether each of the one or more designated positions corresponds to one of the positions of the second objects by comparing the designated position with stored coordinates of the positions of the second objects.

8. The image edit apparatus according to claim 7, wherein the user operation comprises an operation of designating arbitrary regular distance intervals within the synthesis image displayed on the display.

9. The image edit apparatus according to claim 8, wherein the operation of designating the arbitrary regular distance intervals is performed using an image of a tool displayed on the display, the tool being a tool for designating equal intervals and being displayed in a manner superimposed on the synthesis image.

10. A method executed by an image edit apparatus, the image edit apparatus comprising a processor and a storage storing instructions executed by the processor, and the method comprising:

acquiring a plurality of first images obtained by shooting a moving object at time intervals;

outputting a first synthesis image, the first synthesis image being a single image generated by synthesizing a plurality of second images selected from among the acquired first images, and displaying the first synthesis image on a display;

in response to a determination that a designated position, which is designated by a user operation within the first synthesis image displayed on the display, does not correspond to a position of the moving object in any of the second images included in the first synthesis image but agrees with a position of the moving object in one of the first images, outputting a second synthesis image in which the one of the first images is further synthesized on the first synthesis image;

recording the position of each instance of the moving object included within the second synthesis image as coordinates within a coordinate system set to the second synthesis image;

obtaining at least one regression formula within the coordinate system, based on the recorded position of each instance of the moving object included within the second synthesis image; and updating the second synthesis image by adding thereto at least one graph image expressing the obtained at least one regression formula, and displaying the updated second synthesis image on the display.

11. A non-transitory recording medium having a program recorded thereon that is executable by a processor of an image edit apparatus to control the processor to:

acquire a plurality of first images obtained by shooting a moving object at time intervals;

select a plurality of second images from among the acquired first images;

generate a first synthesis image by synthesizing the selected second images into a single image, and display the first synthesis image on a display;

determine whether a designated position, which is designated by a user operation within the first synthesis image displayed on the display and which does not correspond to a position of the moving object in one of the second images included in the first synthesis image, corresponds to a position of the moving object in one of the first images;

generate, in response to determining that the designated position corresponds to a position of the moving object in one of the first images, a second synthesis image by further synthesizing the one of the first images on the first synthesis image, and display the second synthesis image on the display;

record the position of each instance of the moving object included within the second synthesis image as coordinates within a coordinate system set to the second synthesis image;

obtaining at least one regression formula within the coordinate system, based on the recorded position of each instance of the moving object included within the second synthesis image; and updating the second synthesis image by adding thereto at least one graph image expressing the obtained at least one regression formula, and displaying the updated second synthesis image on the display.

* * * * *